United States Patent [19]

Calderbank et al.

[11] Patent Number: 4,901,331

[45] Date of Patent: Feb. 13, 1990

[54] TRELLIS CODES WITH PASSBAND SPECTRAL NULLS

[75] Inventors: Arthur R. Calderbank, Maplewood; James E. Mazo, Fair Haven, both of N.J.

[73] Assignees: American Telephone and Telegraph Company, New York, N.Y.; AT&T Bell Laboratories, Murray Hill, N.J.

[21] Appl. No.: 354,573

[22] Filed: May 19, 1989

[51] Int. Cl.[4] .......................... H04L 5/12; H04L 1/00; H03M 13/00
[52] U.S. Cl. .......................................... 375/39; 371/56
[58] Field of Search .............................. 375/39; 371/56

[56] References Cited

U.S. PATENT DOCUMENTS 4,780,884  10/1988  Lee et al. ........................ 375/19
4,831,635  5/1989  Karabinis ........................ 375/39

Primary Examiner—Benedict V. Safourek
Assistant Examiner—Tesfaldet Bocure
Attorney, Agent, or Firm—Ronald D. Slusky

[57] ABSTRACT

In a data transmission system using a predetermined trellis code, the output signal points are selected from a predetermined alphabet representing (k+n)-bit input words by using the values of n bits of each input word, and bits from previous input words, to identify a particular one of $2^m$ subsets of the signaling alphabet m>n. The other k bits of the input word identify an ensemble of four signal points of the identified subset. This ensemble is characterized by having a first signal point whose odd components and even components each sum to a value no less than zero, a second signal point whose odd components sum to a value no less than zero and even components a value no greater than zero, a third signal point whose odd components sum to a value no greater than zero and even components a value no less than zero, and a fourth signal point whose odd components and even components each sum to a value no greater than zero. Two running sums of odd and even cmponents of the signal points previously generated are separately maintained. At any point in time, the system always manages to select and output a signal point in the identified ensemble so as to drive the individual running sums of the respective odd components and even components toward zero simultaneously. This scheme provides a passband signal having a spectral null at a carrier frequency.

32 Claims, 4 Drawing Sheets

TRELLIS CODES WITH PASSBAND SPECTRAL NULLS

BACKGROUND OF THE INVENTION

The present invention relates to data transmission systems and, in particular, to channel coding in such systems.

Much attention has been focused in recent years on channel codes which provide so-called coding gain. Prominent among these are the so-called "trellis" codes described in such papers as G. Ungerboeck, "Channel Coding with Multilevel/Phase Signals," *IEEE Trans. Information Theory*, IT-28, 1982, pages 55–67; A. R. Calderbank and N. J. A. Sloane, "A New Family of Codes for Dial-Up Voice Lines," *Proc. IEEE Global Telecomm. Conf.*, November 1984, pages 20.2.1–20.2.4; A. R. Calderbank and N. J. A. Sloane, "Four-Dimensional Modulation With an Eight-State Trellis Code," *AT&T Technical Journal*, Vol. 64, No. 5, May-June 1985, pages 1005–1018; A. R. Calderbank and N. J. A. Sloane, "An Eight-Dimensional Trellis Code," *Proc. IEEE*, Vol. 74, No. 5, May 1986, pages 757–759; and L. F. Wei, "Rotationally Invariant Convolutional Channel Coding with Expanded Signal Space—Part I: 180 Degrees and Part II: Nonlinear Codes," *IEEE J. Select. Areas Commun.*, Vol. SAC-2, September 1984, pages 659–686, all of which are hereby incorporated by reference. Commercial use of these codes has, for the most part, been concentrated in voiceband data sets and other carrier data communications systems.

Moreover, it may be advantageous in such systems to have a spectral null in the passband signal at, for example, the carrier frequency so as to minimize the data signal energy concentration around that frequency.

As an example of this, consider the fact that data transmitted over a communication channel in a passband is often corrupted in the channel by such impairments as Gaussian noise, phase jitter, frequency offset and intersymbol interference. At a receiver, in order to substantially compensate for these channel impairments, and to thereby better recover the transmitted data from the received data signals, the channel characteristics need to be determined. One way of achieving this in some communication areas is to transmit a tone signal, for example at a carrier frequency, along with the data signals over the communication channel. The channel characterization is accomplished by analyzing the received corrupted tone signal with reference to the transmitted version.

However, a problem related to this characterization method is that the received tone signal cannot often be substantially isolated from the data signal transmitted therewith. The isolation is normally achieved by a band-pass filter operating on a limited band around the carrier frequency. The bandpass filtered version of the received tone signal normally incorporates therein substantial energy contributed from the data signal within that limited band. This unwanted data signal energy contribution is deemed noise which affects the accuracy in characterizing the channel.

The creation of spectral nulls in a line signal using trellis codes has been disclosed in "Trellis Codes With Spectral Nulls," Application Ser. No. 914,337, filed on October 2, 1986, now U.S. Pat. No. 4,831,635, issued May 16, 1989 to T. A. Lee and A. R. Calderbank, which is also hereby incorporated by reference. However, this reference concentrates on a baseband trellis coding rendering one or more spectral nulls in a baseband line signal, rather than a passband signal as of interest here.

Nevertheless, based on the above-mentioned disclosure of Lee and Calderbank, one can create a spectral null in a passband signal at, for example, the carrier frequency by means of conventional modulation techniques. One of these techniques is quadrature amplitude modulation (QAM) which is commonly used in prior art because of the relatively high bandwidth efficiency resulting therefrom. However, in a prior art arrangement, applying the aforementioned baseband trellis coding technique, as referenced, in co-operation with the QAM technique typically requires two independent encoders. The operations of the latter involve independently taking in first and second data words respectively from a data source, encoding the data words in a trellis code and generating first and second multi-dimensional signal points associated therewith. Components of the first (second) signal points are transmitted as the in-phase (quadrature-phase) components of successive two-dimensional signal pulses. This prior art arrangement further requires that the running values of the component sums of the first and second signal points be individually bound.

SUMMARY OF THE INVENTION

Such a prior art arrangement, however, necessitates, compared with the present invention to be described, a substantially higher signal power for meeting same signal-to-noise ratio for data transmission.

In accordance with the present invention, data from a data source is encoded in a trellis code in an encoder which generates as an output a sequence of multi-dimensional signal points associated therewith. The multi-dimensional signal points so generated are transmitted as successive two-dimensional signal pulses with the odd (even) components of the signal points as the in-phase (quadrature-phase) components of the pulses. It can be shown mathematically that by individually bounding the running sums of the values of the odd and even components of the signal points, a spectral null is created in a passband signal.

Illustratively, where the prior art arrangement uses two encoders to generate two independent sets of trellis coded N-dimensional signal points to create a spectral null in a passband signal, it suffices, in accordance with the present invention, to use one encoder to generate one set of trellis coded 2N-dimensional signal points, instead, to create same. Based on this illustration, it can be shown that the signal power saved by the present invention, with reference to the prior art arrangement, is approximately 3/N dB.

DETAILED DESCRIPTION

Figure 1:
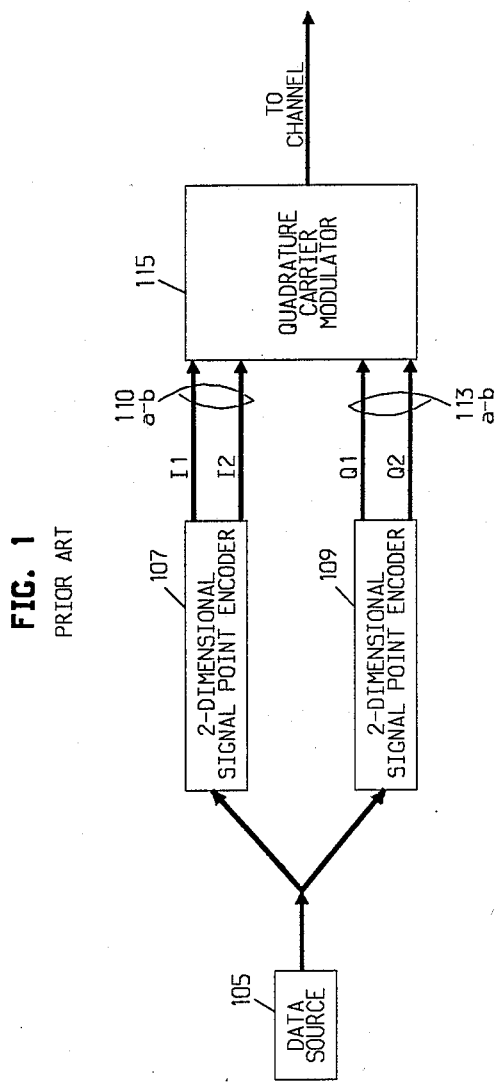
FIG. 1 is a block diagram of a data transmitter according to principles known to the prior art.

FIG. 1 shows a prior art arrangement based on the disclosure in the Lee and Calderbank reference. Lee and Calderbank discloses a technique that creates a spectral null at, for example, dc, in a baseband signal. In accordance with this technique, the signal point to be transmitted is determined as a function of not only the input bits, at least ones of which have been trellis coded, but also as a function of a running value which is a function of the components of the signal points previously transmitted. In particular, by bounding the running sum of the values of these components, a spectral null at dc is guaranteed in a baseband signal.

In furtherance of this technique, a spectral null created in a baseband thereby can be frequency-translated to a passband using conventional modulation techniques. Because of the relatively high bandwidth efficiency afforded by QAM, this modulation technique is conventionally used in prior art. (For details on QAM, see, for example, J. G. Proakis, Digital Communications (New York: McGraw-Hill) 1983, pages 105–106, hereby incorporated by reference.) In particular, by applying QAM to two of the aforementioned baseband signals with spectral nulls at dc, a passband signal with a spectral null at the carrier frequency results.

In the particular prior art arrangement shown in FIG. 1, serial data bits from data source 105 are alternately applied at the inputs of 2-dimensional signal point encoders 107 and 109 which operate independently but are structurally identical. 2-dimensional signal points are thus generated by these two encoders, each of which is, for example, a scaled-down version of encoder 10 as disclosed in FIG. 1 of the aforementioned Lee and Calderbank reference. This scaling-down results from the fact that the dimensionality of signal points generated by the encoder in Lee and Calderbank is four as opposed to two in this particular arrangement. The actual design of encoders 107 and 109, based on the simplification of that encoder in Lee and Calderbank, is readily realized by one skilled in the art and thus need not be dwelled upon here.

Moreover, 2-dimensional signal point encoders 107 and 109 separately perform functions similar to encoder 10 in Lee and Calderbank. That is, each of encoders 107 and 109 individually encodes input data words in a trellis code and selects 2-dimensional signal points or 2-tuples associated therewith to be transmitted. The selection of the signal points, as disclosed in Lee and Calderbank, is carried out so as to bound the running value of the component sum of the signal points generated from that encoder. The signal point thus selected by encoder 107 (109) is represented by components I1 and I2 (Q1 and Q2) which are output on to respective leads 110 $a$–$b$ (113 $a$–$b$). Components I1, I2, Q1 and Q2 are applied to quadrature carrier modulator 115 which completes the QAM process by generating, in two successive baud intervals, two 2-dimensional double sideband quadrature carrier (DSB-QC) pulses whose in-phase and quadrature-phase carriers have (I1, Q1) and (I2, Q2) as their amplitudes. The DSB-QC pulses thus generated, after conventional spectral shaping, are applied to a communication channel.

In accordance with the present invention, it is advantageous to use one set of trellis coded 2N-dimensional signal points—as opposed to two sets of trellis coded N-dimensional signal points in the prior art—to create a spectral null in a passband signal, the advantage of which can be shown to be an approximate saving of 3/N dB in signal power for a particular signal-to-noise ratio achieved. For example, one realizes an approximate saving of 1.5 dB in signal power, compared with the above-mentioned prior art arrangement, by employing the following illustrative arrangement embodying the principles of the present invention. Unlike that prior art arrangement where two sets of trellis coded 2-dimensional signal points are used, this illustrative arrangement, described immediately hereinbelow, uses one set of trellis coded 4-dimensional signal points.

Figure 2:
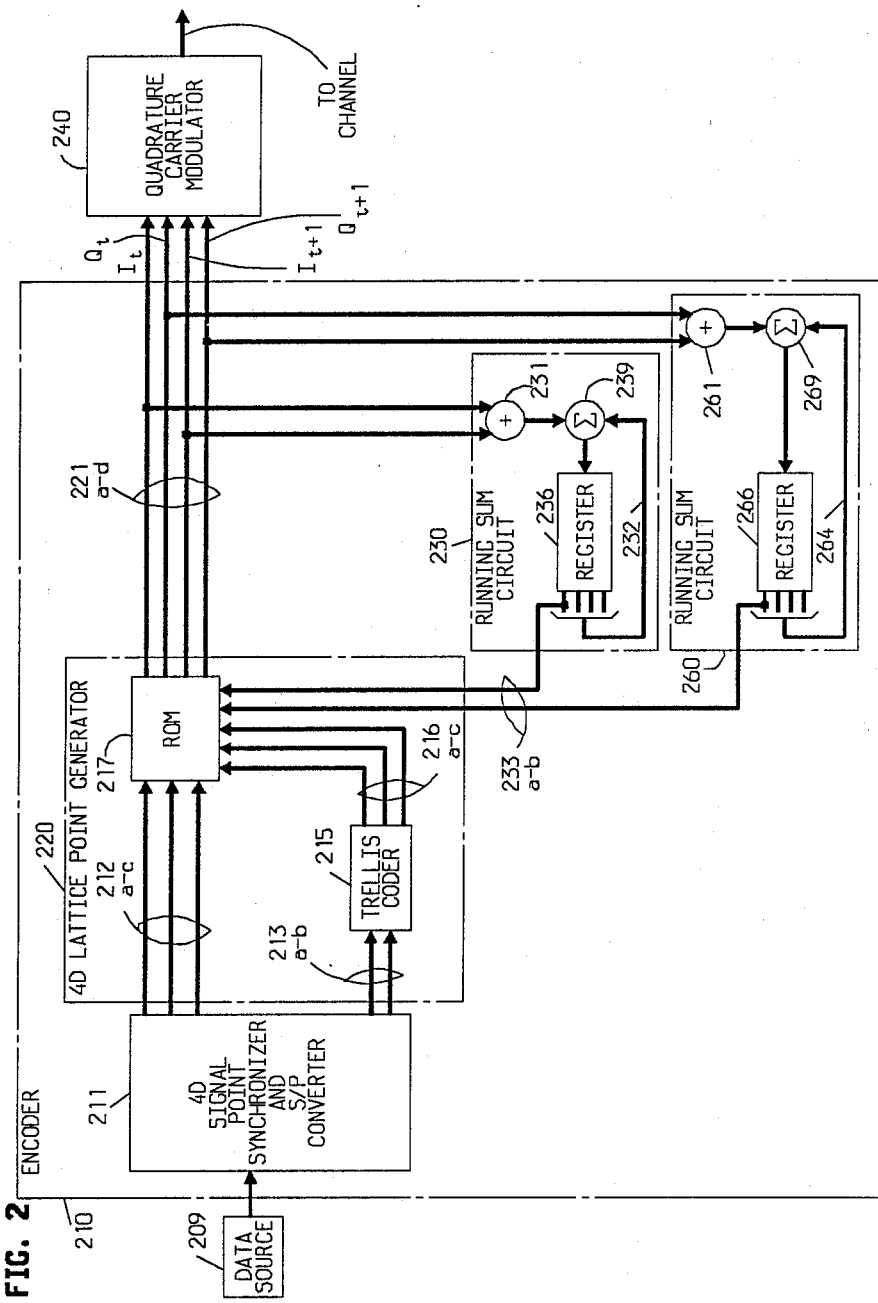
FIG. 2 is a block diagram of a data transmitter embodying the principles of the invention.

In accordance with the present invention, encoder 210 of FIG. 2 receives data in the form of a serial bit stream from a data source 209. This bit stream is applied to 4-dimensional (4D) signal point synchronizer and serial to parallel bit (S/P) converter 211 which assembles the serial bits into (k+n)-bit words. Illustratively, k=3 and n=2, and 4D symbol group synchronizer and S/P converter 211 provides these 5-bit words in parallel on one-bit leads 212 $a$–$c$ and 213 $a$–$b$, three of those bits appearing on leads 212 $a$–$c$ and the other two on leads 213 $a$–$b$. The sequence of input words on leads 212 $a$–$c$ and 213 $a$–$b$ is processed in a manner to be described in detail hereinbelow. Apart from this, two sign bits are generated by running sum circuits 230 and 260 on to respective one-bit leads 233 $a$–$b$. The manner in which this pair of sign bits is generated is also to be described hereinbelow. For the present, however, it suffices to note that, responsive to those input words and that pair of input sign bits, 4D lattice point generator 220 generates 4-dimensional points, or 4-tuples, taken from the lattice of odd integers. The components of each particular lattice point thus generated appears on respective ones of the four multi-bit leads 221 $a$–$d$. These components represent the signal point to be transmitted.

An output sequence of DSB-QC pulses representing the signal points to be transmitted is thereupon generated and applied to the desired communication channel in respective baud intervals. In particular, the four components $I_t$, $Q_t$, $I_{t+1}$ and $Q_{t+1}$ representing a signal point appearing on respective leads 221 $a$–$d$ are applied to modulator 240. The latter generates two DSB-QC signals whose in-phase and quadrature-phase carriers have ($I_t$, $Q_t$) and ($I_{t+1}$, $Q_{t+1}$) as their amplitudes for respective $t^{th}$ and $(t+1)^{st}$ baud intervals so that the so-called carrier "state"—meaning those characteristics of the carrier signal which are information-bearing—is fixed for the duration of the transmission of each channel pulse in question. The particular frequency of these in-phase and quadrature-phase carriers is referred to hereinafter as $f_c$. The DSB-QC signal thus generated, after conventional spectral shaping, is applied to the communication channel as a passband signal around $f_c$.

Each of the four components of the signal points in this embodiment may take on one of the six values, 1, −1, 3, −3, 5, −5, an example being the signal point (1, 3, −3, 1). Hereinafter, the first (second) and third (fourth) components of a signal point are referred to as the odd (even) components of same. The sum of the odd (even) component values of a signal point is referred to as the odd (even) component sum. Continuing the example, 1 and −3 (3 and 1) are the odd (even) components of the signal point (1, 3, −3, 1) and thus its odd (even) component sum is −2 (4). In the present embodiment, not every one of the $4^6=4096$ combinations of these six values is used to represent a signal point. In fact, the alphabet of signal points in this particular embodiment has 256 elements. This alphabet is illustratively divided into $2^m$ subsets, wherein $m>n$. Illustratively, $m=3$ so that there are $2^3=8$ subsets and the alphabet has $2^{(k+m+2)}$ or 256 signal points as just mentioned.

To arrive at the subsets, the 4-tuples are first divided into sixteen parts S(e1, e2, e3, e4) where ei=0 or 1. That is, we denote those sixteen parts S(0000), S(0001), S(0010), etc. A particular 4-tuple (x1, x2, x3, x4) belongs to a particular part S(e1, e2, e3, e4) if xi is congruent to $(-1)^{ei}$ (modulo 4). Thus, for example, a particular 4-tuple belongs to the part S(0011) if the first two components of the 4-tuple are congruent to $(-1)^0$ (modulo 4)—which encompasses the component values +1, −3 and +5—and the second two components of the 4-tuple are congruent to $(-1)^1$ (modulo 4)—which encompasses the component values −1, +3 and −5. In this illustrative embodiment, S(0011) has the following sixteen elements:

| | |
|---|---|
| (1 1 −1 −1) | (1 −3 3 −1) |
| (−3 1 −1 −1) | (1 −3 −1 3) |
| (1 −3 −1 −1) | (5 1 −1 −1) |
| (1 1 3 −1) | (−3 −3 3 −1) |
| (1 1 −1 3) | (−3 −3 −1 3) |
| (−3 −3 −1 −1) | (−3 1 3 3) |
| (−3 1 3 −1) | (1 −3 3 3) |
| (−3 1 −1 3) | (−3 −3 3 3) |

The sixteen parts are then grouped into m=8 subsets as follows:

| | |
|---|---|
| S$_1$ = S(0000) U S(1111) | S$_5$ = S(0001) U S(1110) |
| S$_2$ = S(0011) U S(1100) | S$_6$ = S(0010) U S(1101) |
| S$_3$ = S(1010) U S(0101) | S$_7$ = S(0100) U S(1011) |
| S$_4$ = S(1001) U S(0110) | S$_8$ = S(1000) U S(0111) | where the symbol "U" means "union of". Thus subset S$_2$ includes the sixteen 4-tuples of part S(0011) listed above along with the sixteen 4-tuples arrived at by inverting the sign of each component of that part. By way of example, TABLE I, TABLE II, TABLE III and TABLE IV respectively show the elements of subsets S$_1$, S$_2$, S$_7$ and S$_8$, with specifically, a first quarter of each subset, denoted with a superscript "++", includes all points whose odd components and even components individually sum to a positive value; a second quarter denoted with "+−", includes all points whose odd (even) components sum to a positive (negative) value; a third quarter denoted with "−+", includes all points whose odd (even) components sum to a negative (positive) value; and the last quarter denoted with "−−", includes all points whose odd and even components individually sum to a positive value. Points whose odd components sum to zero and whose even components sum to a positive (negative) value are each arbitrarily assigned to one of the two quarters denoted with "++" ("−−") and "−+" ("+−"). Conversely, points whose odd components sum to a positive (negative) value and whose even components sum to zero are each arbitrarily assigned to one of the two quarters denoted with "++" ("−−") and "+−" ("−+"). Finally, points whose odd and even components individually sum to zero are each arbitrarily assigned to one of the four quarters.

TABLE I

| Input word bit pattern | S$_1$++ | S$_1$+− | S$_1$−+ | S$_1$−− |
|---|---|---|---|---|
| 0 0 0 | (1 1 1 1) | (3 −1 −1 −1) | (−3 1 1 1) | (−1 −1 −1 −1) |
| 0 0 1 | (3 3 −1 −1) | (1 −3 1 1) | (−1 3 −1 −1) | (−3 −3 1 1) |
| 0 1 0 | (3 −1 −1 3) | (−1 −1 3 −1) | (1 1 −3 1) | (−3 1 1 −3) |
| 0 1 1 | (−1 3 3 −1) | (1 1 1 −3) | (−1 −1 −1 3) | (1 −3 −3 1) |
| 1 0 0 | (−1 −1 3 3) | (3 −1 3 −1) | (−3 1 −3 1) | (1 1 −3 −3) |
| 1 0 1 | (3 3 3 −1) | (1 −3 1 −3) | (−1 3 −1 3) | (−3 −3 −3 1) |
| 1 1 0 | (3 3 −1 3) | (5 −3 1 1) | (−5 3 −1 −1) | (−3 −3 1 −3) |
| 1 1 1 | (3 −1 3 3) | (1 1 5 −3) | (−1 −1 −5 3) | (−3 1 −3 −3) |

TABLE II

| Input word bit pattern | S$_2$++ | S$_2$+− | S$_2$−+ | S$_2$−− |
|---|---|---|---|---|
| 0 0 0 | (1 1 −1 −1) | (3 −1 1 −3) | (−3 1 −1 3) | (−1 −1 1 1) |
| 0 0 1 | (3 −1 1 1) | (1 −3 3 −1) | (−1 3 −3 −1) | (−3 1 −1 −1) |
| 0 1 0 | (1 1 3 −1) | (−3 −3 3 −1) | (3 3 −3 1) | (−1 −1 −3 1) |
| 0 1 1 | (1 1 −1 3) | (3 3 1 −3) | (−3 −3 −1 3) | (−1 −1 1 −3) |
| 1 0 0 | (−1 3 1 1) | (3 −1 −3 −3) | (−3 1 3 3) | (1 −3 −1 −1) |
| 1 0 1 | (3 −1 −3 1) | (1 −3 3 3) | (−1 3 −3 −3) | (−3 1 3 −1) |
| 1 1 0 | (1 −3 −1 3) | (−3 −3 3 3) | (3 3 −3 −3) | (−1 3 1 −3) |
| 1 1 1 | (3 3 1 1) | (5 1 −1 −1) | (−5 −1 1 1) | (−3 −3 −1 −1) |

TABLE III

| Input word bit pattern | S$_7$++ | S$_7$+− | S$_7$−+ | S$_7$−− |
|---|---|---|---|---|
| 0 0 0 | (1 −1 1 1) | (1 −1 1 −3) | (−1 1 −1 3) | (−1 1 −1 −1) |
| 0 0 1 | (3 1 −1 −1) | (3 −3 −1 −1) | (−3 3 1 1) | (−3 −1 1 1) |
| 0 1 0 | (1 3 1 1) | (−1 −3 3 −1) | (1 3 −3 1) | (−1 −3 −1 −1) |
| 0 1 1 | (−1 1 3 −1) | (1 3 1 −3) | (−1 −3 −1 3) | (1 −1 −3 1) |
| 1 0 0 | (3 1 3 −1) | (3 −3 3 −1) | (−3 3 −3 1) | (−3 −1 −3 1) |
| 1 0 1 | (3 1 −1 3) | (3 −3 −1 3) | (−3 3 1 −3) | (−3 −1 1 −3) |
| 1 1 0 | (−1 1 3 3) | (−1 −3 3 3) | (1 3 −3 −3) | (1 −1 −3 −3) |

TABLE III-continued

| Input word bit pattern | $S_7$ ++ | $S_7$ +- | $S_7$ -+ | $S_7$ -- |
|---|---|---|---|---|
| 1 1 1 | (3 1 3 3) | (3 -3 3 3) | (-3 3 -3 -3) | (-3 -1 -3 -3) |

TABLE IV

| Input word bit pattern | $S_8$ ++ | $S_8$ +- | $S_8$ -+ | $S_8$ -- |
|---|---|---|---|---|
| 0 0 0 | (-1 1 1 1) | (3 -3 1 1) | (-3 3 -1 -1) | (1 -1 -1 -1) |
| 0 0 1 | (3 1 1 1) | (3 1 1 -3) | (-3 -1 -1 3) | (-3 -1 -1 -1) |
| 0 1 0 | (1 3 -1 -1) | (-1 -3 1 -3) | (1 3 -1 3) | (-1 -3 1 1) |
| 0 1 1 | (1 -1 -1 3) | (3 -3 -3 1) | (-3 3 3 -1) | (-1 1 1 -3) |
| 1 0 0 | (3 1 -3 1) | (3 -3 1 -3) | (-3 3 -1 3) | (-3 -1 3 -1) |
| 1 0 1 | (1 3 3 -1) | (3 1 -3 -3) | (-3 -1 3 3) | (-1 -3 -3 1) |
| 1 1 0 | (1 -1 3 3) | (3 -3 -3 -3) | (-3 3 3 3) | (-1 1 -3 -3) |
| 1 1 1 | (1 3 3 3) | (5 -1 -1 -1) | (-5 1 1 1) | (-1 -3 -3 -3) |

The implementation of these tables is to be described hereinbelow. However, a closer look at these tables reveals that the complement of an element of $S_i$ ++ ($S_i$ +-), formed by inverting signs of all the components of that element, is an element of $S_i$ -- ($S_i$ -+) representing same input word bit pattern, and vice versa, where i takes on a value of 1, 2 ... 8. That is, for example, the complement of (1 3 3 3) of $S_8$ ++ representing input word bit pattern 111 is (-1 -3 -3 -3), which, as illustrated in TABLE IV, is an element of $S_8$ -- representing same. With this so-called "complement" rule, once the elements of $S_i$ ++ (or $S_i$ --) and $S_i$ +- (or $S_i$ -+) of a particular subset are defined, the elements of all four quarters of $S_i$ are thus defined.

Another rule, hereinafter referred to as "subset translation" rule, relates to defining elements of one subset based on elements of another subset representing same input word bit patterns. In order to explicate this rule, we need to define an operation denoted D. Operation D inverts the signs of even components of individual elements of a subset. For example, D (3 -1 3 3)=(3 1 3 -3). Specifically, the second rule is stated as follows:

D (element of $S_1$ ++)=element of $S_3$ +-    (1a)

D (element of $S_1$ +-)=element of $S_3$ ++    (1b)

D (element of $S_2$ ++)=element of $S_4$ +-    (2a)

D (element of $S_2$ +-)=element of $S_4$ ++    (2b)

D (element of $S_7$ ++)=element of $S_5$ +-    (3a)

D (element of $S_7$ +-)=element of $S_5$ ++    (3b)

D (element of $S_8$ ++)=element of $S_6$ +-    (4a)

D (element of $S_8$ +-)=element of $S_6$ ++    (4b)

For example, according to sub-rule (1a), an element of $S_1$ ++ representing a particular input word bit pattern, after undergoing operation D, becomes an element of $S_3$ +- representing same. Furthermore, since all the elements of $S_1$ ++ are known by referring to TABLE I, it follows by sub-rule (1a), all elements of $S_3$ +- are defined. Similarly, since all the elements of $S_1$ +- are also known from TABLE I, it follows by sub-rule (1b), all elements of $S_3$ ++ are also defined. Having all the elements of $S_3$ ++ and $S_3$ +- just defined, all elements of remaining two quarters of $S_3$, i.e. $S_3$ -+ and $S_3$ --, can be defined utilizing the aforementioned "complement" rule. Thus all the elements of the four quarters of $S_3$ are now defined.

Based on the foregoing, all elements of four quarters of $S_4$, $S_5$ and $S_6$ can individually be derived in the same manner by referring to TABLE II, TABLE III and TABLE IV and applying sub-rules 2(a) and 2(b), 3(a) and 3(b), and 4(a) and 4(b), respectively. In conclusion, all elements, divided into four quarters, of each one of the eight subsets are now defined.

Referring again to FIG. 2, 4D lattice point generator 220 includes read-only memory (ROM) 217 and trellis coder 215. The two bits on leads 213 a-b are passed into trellis coder 215 which generates three bits on respective one-bit leads 216 a-c. (Trellis coder 215 is thus a so called rate ⅔ trellis coder.) These three bits are taken in by ROM 217 as an input which identifies, in a manner to be described in further detail hereinbelow, a particular one of the eight subsets $S_1$ through $S_8$. Given that there are $2^5=32$ signal points in each subset, five additional bits need to be applied to ROM 217 to identify a particular one of the 32 signal points in the identified subset.

In accordance with the present invention, however, an input word having less than five bits is applied to the ROM. Thus the input word identifies not one, but a plurality of, signal points in the subset. Specifically, an input word comprised of the three bits on leads 212 a-c is applied to ROM 217. This 3-bit input word identifies a particular ensemble of four signal points within the identified subset.

The assignment of 3-bit input word values to ensembles of four signal points could be made arbitrarily in each subset. In the present embodiment, the specific assignment of the input word values is illustratively shown in TABLE I, TABLE II, TABLE III and TABLE IV. Thus, for example, as shown in TABLE I, a 3-bit input word in bit pattern 000 corresponds to the ensemble of signal points (1 1 1 1), (3 -1 -1 -1), (-3 1 1 1) and (-1 -1 -1 -1).

In order to determine which signal point of the identified ensemble is to be output by encoder 210, two running values, each of which is a function of the components of the signal points previously generated by the encoder, are maintained, those two running values illustratively being first and second running sums of odd and even components of the signal points, respectively. At any point in time if both first and second running sums are individually less (greater) than 0, the encoder outputs the signal point of the identified ensemble whose individual odd and even component sums are greater (less) than 0; if the first running sum is less (greater) than 0 and the second running sum is greater (less) than 0, the encoder outputs the signal point of the identified ensemble whose odd component sum is greater (less) than 0 and whose even component sum is less (greater) than 0, thus driving each of the two running sums toward zero. Moreover, at any point in time if the first running sum is greater (less) than zero and the second running sum is zero, the encoder outputs an arbitrary one of the two points of the identified ensemble where those two points both have odd component sum less (greater) than zero; conversely, if the first running sum is zero and the second running sum is greater (less) than zero, the encoder outputs an arbitrary one of the two points of the identified ensemble where those two points both have even component sum less (greater) than zero. Thus if one of the first and second running sums is not already zero, then it is driven toward zero. Finally, at any point in time if each of the first and second running sum is zero, the encoder outputs an arbitrary one of the points of the identified ensemble. (For the general case, it can be stated same except that the predetermined value is some constant C, rather than zero as illustratively used in the present embodiment.)

The above-described coding scheme has at least two important characteristics. Firstly, as with any well-designed trellis coding scheme, it provides so-called "coding gain", thereby yielding an increase in signal-to-noise ratio, and thus better performance. That is, the ratio of (a) the minimum squared Euclidean distance between successively transmitted sequences of signal points and (b) the average power of the transmitted signal points is greater than in an "un-coded" system, i.e., a system in which the five bits on leads 112 $a$–$c$ and 113 $a$–$b$ would be coded using $2^5 = 32$-element alphabet.

Specifically, it can be shown mathematically that the minimum squared Euclidean distance between the 4-dimensional signal points used in the present illustrative coding scheme is 16, as opposed to 4 in the un-coded system. This renders a coding gain of 6 dB. However, this coding gain must be discounted for a decrease in the average power of the signal points transmitted, a concomitant of using this illustrative coding scheme which requires an expansion of the alphabet while keeping the overall transmission power same as in the un-coded system. As illustrated in this embodiment, an alphabet of 256 elements, rather than 32 as in the "un-coded" system, is required. Because of the 4-dimensional nature of the elements, this three size-doubling of the alphabet results in a decrease in the average signal power of 4.5 dB which is to be discounted from the aforementioned 6 dB coding gain. As a result, this illustrative coding scheme renders a net coding gain of 1.5 dB, compared with that of the un-coded system.

The aforementioned first and second running sums are each guaranteed to have an upper and lower bound; as it turns out, they will never exceed 6 and will never be less than −6. This being so, it can be proved mathematically that the spectrum of the output of the modulator, and thus the spectrum of the passband signal applied to the channel, is guaranteed to have a spectral null at the carrier frequency, $f_c$.

In appreciating how encoder 210 implements the foregoing, it is useful to first consider the operation of running sum circuits. In this illustrative embodiment, running sum circuits 230 and 260, which are structurally identical, keep the respective running values of odd and even component sums of the signal points at the encoder output. The task of running sum circuit 230 (260) is to ensure that the odd (even) component sum of the signal point to be selected is positive if the running value is currently negative and vice versa. To this end, circuit 230 (260) includes a register 236 (266) which holds the current running value of the odd (even) component sum. The sign of that value, illustratively represented by a sign bit on one of the register 236 (266) output leads 233$a$ (233$b$), is applied to ROM 217. Illustratively, the sign bit has a value of 0 (1) if the current running value is positive (negative).

In operation, the values of odd (even) components of a current signal point appearing on respective leads 221 $a$ and $c$ ($b$ and $d$) are provided as inputs to adder 231 (261) within running sum circuit 230 (260). Adder 231 (261) thus generates the odd (even) component sum thereof. This odd (even) component sum is thereafter combined in an accumulator 239 (269) with the present running value, provided on multi-bit lead 232 (264). The output of accumulator 239 (269) representing the current running value of the odd (even) component sum is shifted and buffered in register 236 (266).

As mentioned before, the two sign bits applied to ROM 217 indicate to the latter the signs of the respective current running values of odd and even component sums. ROM 217 accordingly selects a signal point to come from an appropriate subset quarter so as to drive each of the two individual running sums to zero. Thus, for example, in response to a pair of input sign bits with respective values of 0 and 1, i.e., the current running odd component sum being positive and the current running even component sum being negative, ROM 217 selects a signal point to come from one of the subset quarters superscripted "− +" so as to nullify the individual sums. As noted before, an element of any one of those "− +" subset quarters is characterized by having the odd component sum negative and the even component sum positive. Similarly, ROM 217 selects a signal point to come from a subset quarter superscripted "− −" in response to input sign bits of 00, a subset quarter "+ −" in response to input sign bits of 10, and a subset quarter "+ +" in response to input sign bits of 11.

4D lattice point generator 220 is configured to (a) store in ROM 217 the signal points of particular ones of the subsets in subset quarters, (b) configure trellis coder 215 to generate a subset identification bit pattern corresponding to the subset from which the output signal point is to come, (c) take in the k-bit input word for ROM 217 to identify a particular ensemble of the stored signal points associated therewith, (d) take in a pair of the aforementioned sign bits for ROM 217 to identify a particular subset quarter of the identified subset and (e) retrieve from that particular ensemble a particular one of the stored signal points in that particular subset quarter.

Specifically, ROM 217 which is of conventional design stores therein signal points of particular ones of the subsets. The storage can be visualized as formatted in, for example, TABLE I. Upon receiving from leads 216 $a$–$c$ three subset identification bits whose assignment is to be described hereinbelow, ROM 217 conceptually turns to a table associated with those subset identification bits, for example, TABLE I if those bits represent subset $S_1$. Moreover, based on the 3-bit input word on respective leads 212 $a$–$c$, an ensemble of four signal points are identified by ROM 217 from the identified subset. Thus continuing the example where the identified subset is $S_1$, an input word of bit pattern 001 enables ROM 217 to identify, as illustrated in TABLE I, an ensemble of four signal points (3 3 −1 −1), (1 −3 1 1), (−1 3 −1 −1) and (−3 −3 1 1) associated with that input word bit pattern. Furthermore, based on the input of a pair of sign bits indicating the appropriate quarter of the identified subset from which the output signal point is to come, a particular signal point of the ensemble is identified. Thus continuing the previous example, an input of sign bits of 00 indicates to ROM 217 that the output signal point is to come from $S_1$ − −. Again, referring to TABLE I, this uniquely identifies the particular signal point (−3 −3 1 1) of $S_1$ − − from the above-identified ensemble. This particular signal point is thus retrieved by 4D lattice point generator 220 and is to be transmitted.

In practice, the amount of information in ROM 217 needs to be stored can be shortcut by utilizing the aforementioned "complement" rule and the "subset translation" rule—1 (a) and (b), 2 (a) and (b), 3 (a) and (b) and 4 (a) and (b). Specifically, ROM 217 needs only to store the signal points of subset quarters of $S_1$ ++ and $S_1$ +−, $S_2$ ++ and $S_2$ +−, $S_7$ ++ and $S_7$ +−, and $S_8$ ++ and $S_8$ +− as set forth in TABLE I, TABLE II, TABLE III and TABLE IV, respectively.

Trellis coder 215 generates an identification bit pattern representing the subset from which a signal point is to come. A particular trellis code to be described hereinbelow determines the relationship between individual subsets and the identification bit patterns associated therewith. The following TABLE V summarizes the association of the identification bit patterns with individual subsets using such a particular trellis code.

TABLE V

| To generate a point in subset | use subset identification bit pattern |
| --- | --- |
| S1 | 000 |
| S2 | 011 |
| S3 | 101 |
| S4 | 110 |
| S5 | 001 |
| S6 | 010 |
| S7 | 100 |
| S8 | 111 |

Figure 3:
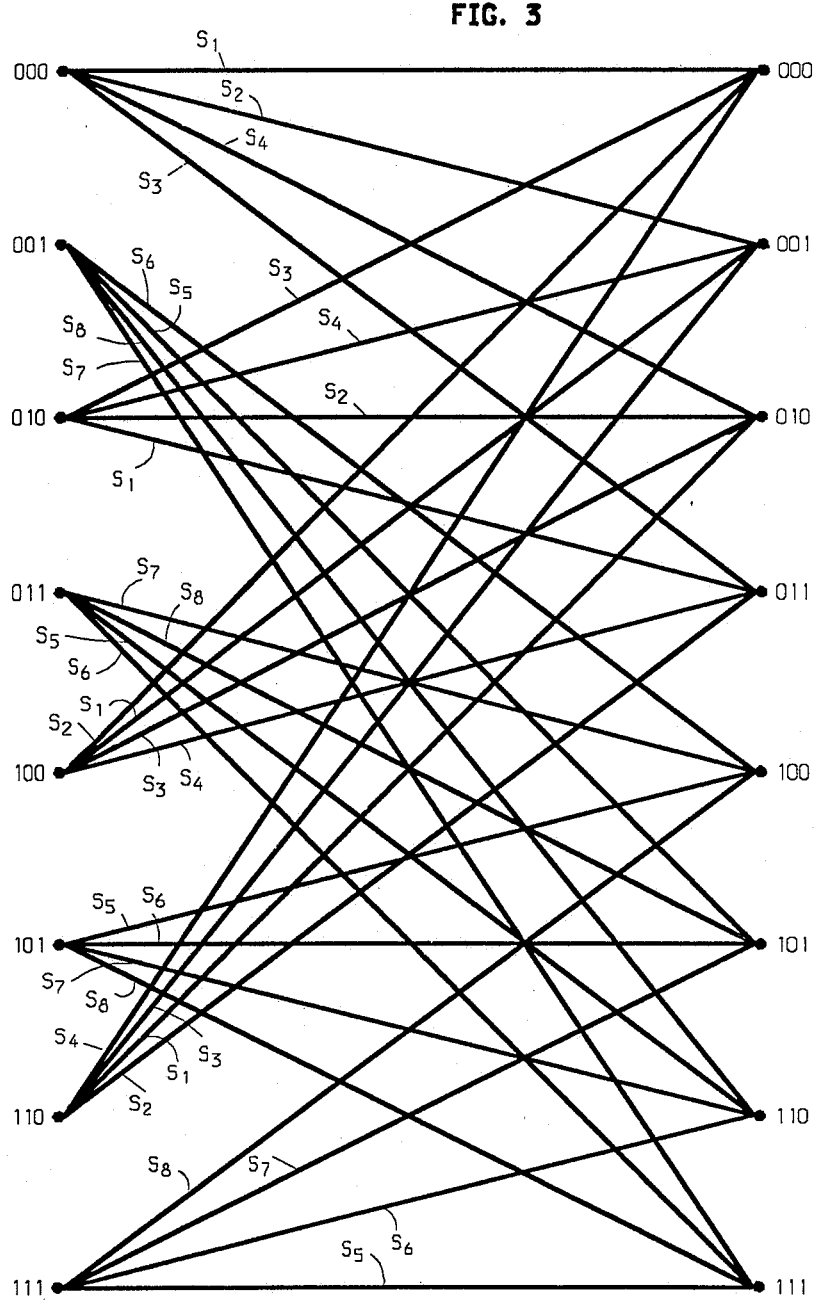
FIG. 3 is a trellis diagram depicting the trellis code used in the transmitter of FIG. 2.

In the present illustrative embodiment, the particular trellis code used to determine from which subset each signal point is to come is represented by the trellis diagram shown in FIG. 3. The coder has eight "states", denoted 000, 100, 010, 110, 001, 101, 011 and 111. The state of a trellis coder is a function of at least one bit of at least one input word received prior to the current input word. In this embodiment, more specifically, the state of the coder is a function of (a) the two bits applied to the coder previous to the two current bits and (b) one of the bits applied to the coder previous to that. Thus, for example, if the coder is in state 001, this means that the two bits previously applied to the coder were "1" and "0" (the bits of the state are read right-to-left) and that one of the bits of the pair applied to the coder before that—illustratively the bit on lead 213b—was "0". Further, if the current bit pair on leads 213a-b is, for example, 11, then the next state will be 111.

The vertical lines of points in FIG. 3 represent the eight possible coder states at successive time intervals, and the lines connecting various pairs of state indicate the possible state transitions. Thus, for example, it is possible for the coder to transition from state 010 to state 001 but not to state 100.

Each of these connecting lines bears a label indicating which subset the next signal point to be generated is to come from. Thus, continuing the example above, assume that the current state of the coder is 001 and that when the next set of bits is output from 4D signal point synchronizer and S/P converter 211, the bit pair on leads 213 a-b is "11". This means that the next signal point to be generated is to come from subset $S_7$ since the line connecting state 001 in the left column to state 111 in the right column is labeled $S_7$.

Figure 4:
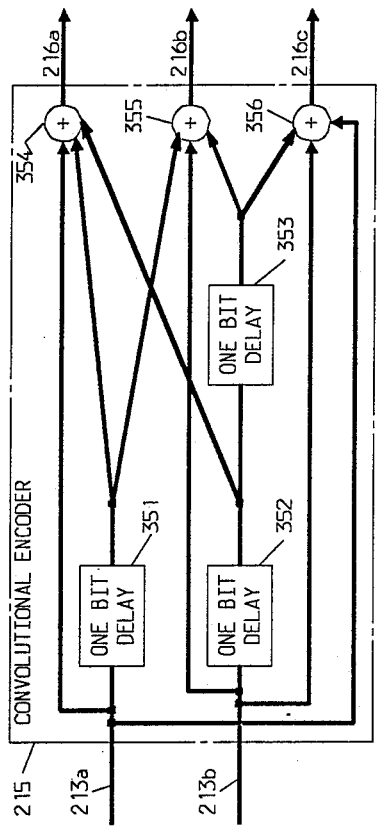
FIG. 4 is a block diagram of the trellis coder used in the transmitter of FIG. 2.

A circuit embodiment of trellis coder 215 is shown in FIG. 4. The two current bits applied to the coder are applied thereto from leads 213 a and b. The two bits previously applied to the coder are held in one-bit delay elements 351 and 352. The bit applied to the coder on lead 213b before that is held in one-bit delay element 353, which gets its input from the output of delay element 352. The values held in the three delay elements are applied to binary adders 354, 355 and 356, along with the values of the two current bits on leads 213a-b, in the manner shown. Each binary adder outputs a "0" ("1") if an even (odd) number of its input bits has the value "1". The outputs of adders 354, 355, 356 constitute the proper subset identification bit pattern specified by the trellis of FIG. 3 and TABLE V.

Figure 5:
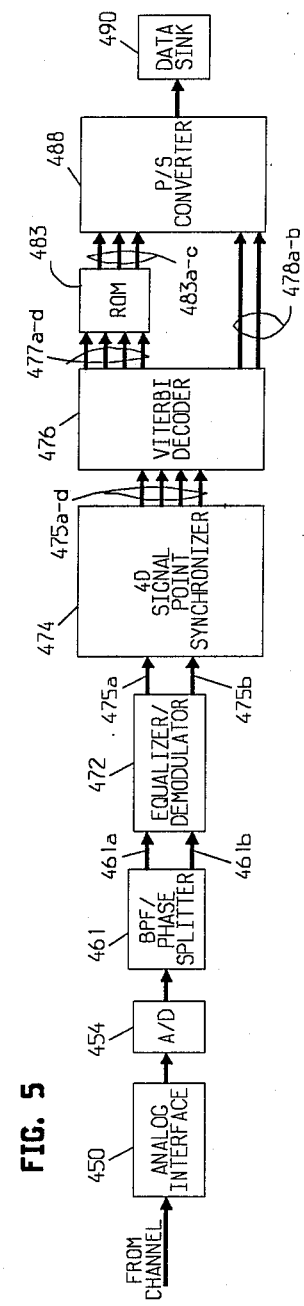
FIG. 5 is a block diagram of a receiver adapted to recover the data encoded and transmitted by the transmitter of FIG. 2.

The receiver of FIG. 5 is of conventional design. In particular, the stream of passband signals transmitted over the channel is received and applied to analog interface 450 which includes an antialiasing filter and automatic gain control (AGC) circuit. The resulting signal is then applied to A/D converter 454. The resulting digital samples are applied to bandpass filter/phase splitter 461. The latter provides two outputs on cables 461 a and b, these being a digital bandpass-filtered version of the A/D converter output and the Hilbert transform of same, respectively.

The signals on cables 461 a and b are applied to equalizer/demodulator 472. For each baud interval, the latter provides as its output on cables 475 a and b a pair of baseband equalizer outputs which respectively represent the values of the in-phase and quadrature-phase components of the received 2-dimensional carrier pulse currently being processed. Because, for example, the equalizer cannot perfectly compensate for all possible channel effects and impairments, the values are not, in general, whole integers. Therefore, it remains to be determined from the outputs of equalizer/demodulator 472 what the most likely transmitted values were.

To this end, 4D signal point synchronizer 474 assembles each received signal point which is comprised of four components by collecting a pair of the equalizer/demodulator outputs. These four components of a signal point appear on respective leads 475 a–d. Because of the aforementioned imperfect channel compensation, a typical received signal point might be, for example, (−1.1, 3.4, −2.8, 1.0). It is the task of Viterbi decoder 476, which receives the signal points on leads 475 a–d, to determine what the most likely sequence of transmitted signal points actually was. Like the rest of the receiver, the Viterbi decoder is of conventional design and need not be discussed in detail. (For details on the operation of Viterbi decoders, see, for example, A. J. Viterbi and J. K. Omura, Principles of Digital Communications and Coding (New York: McGraw-Hill) 1979, hereby incorporated by reference.)

Rather, it suffices to note that Viterbi decoder 476 applies the so-called Viterbi algorithm to the trellis of FIG. 3 to determine what the most likely sequence of transmitted signal points was and, in the process, to determine the state of the encoder as each signal point was generated. The estimated sequence of signal points is provided on multi-bit output leads 477 a–d. In addition, given its knowledge of what the sequence of encoder states was, decoder 476 is able to output on leads 478 a–b the values of the two bits that appeared on leads 213 a–b in the transmitter at the time that each of the signal points was generated.

The three bits that appeared on leads 212 a–c at that time are recovered from the signal point on leads 477 a–d. By looking up the particular sequence of its components on leads 477 a–d, ROM 483 a–c a corresponding three-bit pattern supposingly identical to that on leads 212 a–c. The bits of the resulting 5-bit word on leads 483 a–c and 478 a–b are converted to serial form by P/S converter 485 and applied to data sink 490.

The foregoing merely illustrates the principles of the present invention. For example, although a particular alphabet and particular trellis code are used in the illustrative embodiment, it will be appreciated that the present invention can be implemented in a system using any of a myriad of different possible alphabets, and trellis codes, including various values of m, n, k and N. Moreover, although the system disclosed herein is embodied in the form of various discrete electronic building blocks and components, the invention could equally as well be embodied in a system in which the functions of any one or more of those building blocks and components or, indeed, all of the functions thereof, are realized by, for example, one or more appropriately programmed processors.

It will thus be appreciated that those skilled in the art will be able to devise numerous arrangements which, although not explicitly shown or described herein, embody the principles of the invention and are thus within its spirit and scope.

We claim:

1. A data transmission system adapted to transmit on a communication channel a sequence of passband signals in response to a sequence of (k+n)-bit input words, each of said passband signals representing a respective signal point of a predetermined alphabet of signal points, said system comprising
    means responsive to the values of n bits of each input word in said input word sequence and the value of at least one bit of a previous input word in said input word sequence for identifying one of $2^m$ predetermined subsets of said alphabet, m being an integer greater than n,
    means responsive to the other k bits of said each input word for identifying a plurality of signal points of said one subset,
    means for selecting one of said plurality of signal points as a function of two independent variables which are the respective odd and even components of the signal points represented by previously transmitted ones of said passband signals, and
    a quadrature carrier modulator for generating on said communication channel as an individual one of said sequence of passband signals a signal representing the selected signal point, the in-phase and quadrature-phase inputs to said modulator respectively being the odd and even components of said selected signal point.

2. The invention of claim 1 wherein said one of said plurality of signal points is selected in response to two individual running sums of the odd and even components of the signal points represented by previously transmitted ones of said passband signals.

3. The invention of claim 2 wherein each said plurality of signal points is an ensemble of four signal points, wherein a first signal point has individual odd component and even component sums each at least equal to a particular predetermined value; a second signal point has an odd component sum at least equal to and an even component sum no greater than said particular predetermined value; a third signal point has an odd component sum no greater than and an even component sum at least equal to said particular predetermined value; and a fourth signal point has individual odd component and even component sums each no greater than said particular predetermined value, and wherein said means for selecting selects said one of said ensemble of four signal points to drive each one of said two individual running sums of the odd and even components of the signal points toward said particular predetermined value.

4. The invention of claim 3 wherein each of the components of the signal points of said alphabet is an odd integer.

5. The invention of claim 3 wherein said particular predetermined value is zero.

6. A data transmission system adapted to transmit on a communication channel passband signals each representing a respective one of a sequence of signal points, each of said signal points being associated with a respective input word of a sequence of (k+n)-bit input words and being selected from a predetermined alphabet of $2^{(k+m+2)}$ signal points, k, m and n being predetermined integers where m is greater than n, said system comprising
    means for identifying one of $2^m$ predetermined subsets of said alphabet for each input word of said input word sequence in response to the values of n bits of said each input word and the value of at least one bit of a previous input word in said input word sequence,
    means responsive to the other k bits of said each input word for identifying an ensemble of four signal points of said one subset,
    means for selecting one of said ensemble of four signal points in response to first and second sets of values of, respectively, odd and even components of previous signal points of said signal point sequence, and
    a quadrature carrier modulator for generating on said communication channel as an individual one of said sequence of passband signals a signal representing the selected signal point, the in-phase and quadrature-phase inputs to said modulator respectively being the odd and even components of said selected signal point.

7. The invention of claim 6 wherein said means for selecting selects one of said ensemble of four signal points in response to first and second running sums of said first and second sets of values, respectively.

8. The invention of claim 7 wherein each said ensemble of four signal points is comprised of a first signal point having individual odd component and even component sums each at least equal to a particular predetermined value, a second signal point having an odd component sum at least equal to and an even component sum no greater than said particular predetermined value, a third signal point having an odd component sum no greater than and an even component sum at least equal to said particular predetermined value, and a fourth signal point having individual odd component and even component sums each no greater than said particular predetermined value, and wherein said means for selecting selects said one of said signal points of said ensemble to drive each one of said first and second running sums toward said particular predetermined value.

9. The invention of claim 8 wherein each of the components of each of the signal points of said alphabet is an odd integer.

10. The invention of claim 8 wherein said particular predetermined value is zero.

11. The invention of claim 8 wherein said alphabet is partitioned such that each subset that includes a particular one of the signal points of said alphabet also includes a signal point each of whose components is the negative of the corresponding component of said particular one signal point.

12. A data transmission system for transmitting on a communication channel passband signals each representing a respective one of signal points which are generated by said system in response to a sequence of (k+n)-bit input words, k and n being predetermined integers, each of said signal points being selected from a predetermined alphabet of signal points, divided into $2^m$ subsets, m being an integer greater than n, each of said subsets comprising $2^k$ ensembles of four signal points, each of which comprises a first signal point having individual odd component and even component sums each at least equal to a particular predetermined value, a second signal point having an odd component sum at least equal to and an even component sum no greater than said particular predetermined value, a third signal point having an odd component sum no greater than and an even component sum at least equal to said predetermined particular value, and a fourth signal point having individual odd component and even component sums each no greater than said particular predetermined value, said system comprising means for maintaining a first running sum and a second running sum of the values of, respectively, the odd and even components of signal points already generated by said system, encoder means responsive to n of the bits of a particular input word of said input word sequence and at least one bit of a previous input word of said sequence for identifying the subset containing the signal point to be generated to represent said particular input word, said encoder means being further responsive to the other k bits of said particular input word for identifying the particular one of said ensembles in said subset containing said signal point to be generated, said encoder means being further responsive to the individual relative values of the first and second running sums and said particular predetermined value for identifying one of the signal points of said particular one of said ensembles as said signal point to be generated, and a quadrature carrier modulator for generating on said communication channel as an individual one of said sequence of passband signals a signal representing the generated signal point, the in-phase and quadrature-phase inputs to said modulator respectively being the odd and even components of said generated signal point.

13. The invention of claim 12 wherein said particular predetermined value is zero and wherein said encoder means identifies said first signal point of said particular one of said ensemble when said first and second running sums are each less than zero, identifies said second signal point of said particular one of said ensemble when said first running sum is less than zero and said second running sum is greater than zero, identifies said third signal point of said particular one of said ensemble when said first running sum is greater than zero and said second running sum is less than zero, and identifies said fourth signal point when said first and second running sums are each greater than zero.

14. A data transmission system comprising means operative for generating in response to each of a series of received multi-bit input words an individual signal point of a predetermined alphabet of signal points, divided into $2^m$ subsets, each of said subsets comprising $2^k$ ensembles of four signal points, m and k being integers, each of said ensembles comprising a first signal point and a second signal point each having the sum of odd components thereof no less than a particular predetermined value, and a third signal point and a fourth signal point each having same no greater than said particular predetermined value, said first signal point and said third signal point each having the sum of even components thereof no less than said particular predetermined value and said second signal point and said fourth signal point each having same no greater than said particular predetermined value, means for maintaining a first running sum and a second running sum of the values of, respectively, the odd and even components of the signal points previously generated by said data transmission system, and a quadrature carrier modulator for generating on said communication channel a passband signal representing said individual signal point generated by said data transmission system, the in-phase and quadrature-phase inputs to said modulator respectively being the odd and even components of said individual signal point, each of said input words comprising (k+n) bits, n being less than m, and said generating means being adapted to trellis-code n bits of successive one of said subsets as containing the signal point to be generated, said generating means being further adapted to identify a particular one of said ensembles associated with the other k bits of said particular input word, said identified signal point being said first signal point of said particular one of said ensembles if the first and second running sums are each less than said particular predetermined value, being said second signal point of said particular one of said ensembles if said first running sum is less than and said second running sum is greater than said particular predetermined value, being said third signal point of said particular one of said ensembles if said first running sum is greater than and said second running sum is less than said particular predetermined value, and being said fourth signal point of said particular one of said ensembles if said first and second running sums are each greater than said particular predetermined value.

15. The invention of claim 14 wherein said particular predetermined value is zero.

16. The invention of claim 14 wherein each of the components of each of the signal points of said alphabet is an odd integer.

17. The invention of claim 14 wherein said alphabet is partitioned such that each subset that includes a particular one of the signal points of said alphabet also includes a signal point each of whose components is the negative of the corresponding component of said particular one signal point.

18. A data transmission system of the type in which individual signal points are selected from a predetermined signaling alphabet for transmission over a communication channel as a function of a sequence of input words at least ones of whose bits have been trellis coded, said system comprising means for maintaining first and second running values which are functions of, respectively, the odd and even components of the selected signal points, means for selecting said individual signal points for transmission further as a function of the two individual maintained running values, and a quadrature carrier modulator for generating on said communication channel a passband signal representing the selected signal point for transmission, the in-phase and quadrature-phase inputs to said modulator respectively being the odd and even components of said selected signal point.

19. The invention of claim 18 wherein said first and second running values are running sums of, respectively, the odd and even components of the selected signal points.

20. A method for use in a data transmission system adapted to transmit on a communication channel a sequence of passband signals in response to a sequence of (k+n)-bit input words, each of said passband signals representing a respective signal point of a predetermined alphabet of signal points, said method comprising the steps of identifying one of $2^m$ predetermined subsets of said alphabet in response to the values of n bits of each input word in said input word sequence and the value of at least one bit of a previous input word in said input word sequence, m being an integer greater than n, identifying a plurality of signal points of said one subset in response to the other k bits of said each input word, selecting one of said plurality of signal points as a function of two independent variables which are the respective odd and even components of the signal points represented by previously transmitted ones of said passband signals, and generating on said communication channel as an individual one of said sequence of passband signals a signal representing the selected signal point, said signal being comprised of a plurality of pulses whose individual in-phase and quadrature-phase amplitudes being respectively associated with the odd and even components of said selected signal point.

21. The invention of claim 20 wherein said one of said plurality of signal points is selected in response to two individual running sums of the odd and even components of the signal points represented by previously transmitted ones of said passband signals.

22. The invention of claim 21 wherein each said plurality of signal points is an ensemble of four signal points, wherein a first signal point has individual odd component and even component sums each at least equal to a particular predetermined value; a second signal point has an odd component sum at least equal to and an even component sum no greater than said particular predetermined value; a third signal point has an odd component sum no greater than and an even component sum at least equal to said particular predetermined value; and a fourth signal point has individual odd component and even component sums each no greater than said particular predetermined value, and wherein in said selecting step said one of said ensemble of four signal points is selected to drive each one of said two individual running sums of the odd and even components of the signal points toward said particular predetermined value.

23. The invention of claim 22 wherein each of the components of the signal points of said alphabet is an odd integer.

24. The invention of claim 22 wherein said particular predetermined value is zero.

25. A method for use in a data transmission system adapted to transmit on a communication channel passband signals each representing a respective one of a sequence of signal points, each of said signal points being associated with a respective input word of a sequence of (k+n)-bit input words and being selected from a predetermined alphabet of $2^{(k+m+2)}$ signal points, k, m and n being predetermined integers where m is greater than n, said method comprising the steps of identifying one of $2^m$ predetermined subsets of said alphabet for each input word of said input word sequence in response to the values of n bits of said each input word and the value of at least one bit of a previous input word in said input word sequence, identifying an ensemble of four signal points of said one subset in response to the other k bits of said each input word, selecting one of said ensemble of four signal points in response to first and second sets of values of, respectively, the odd and even components of previous signal points of said signal point sequence, and generating on said communication channel as an individual one of said passband signals a signal representing the selected signal point, said signal being comprised of a plurality of pulses whose individual in-phase and quadrature-phase amplitudes being respectively associated with the odd and even components of said selected signal point.

26. The invention of claim 25 wherein in said selecting step one of said ensemble of four signal points is selected in response to first and second running sums of said first and second sets of values, respectively.

27. The invention of claim 26 wherein each said ensemble of four signal points is comprised of a first signal point having individual odd component and even component sums each at least equal to a particular predetermined value, a second signal point having an odd component sum at least equal to and an even component sum no greater than said particular predetermined value, a third signal point having an odd component sum no greater than and an even component sum at least equal to said predetermined particular value, and a fourth signal point having individual odd component and even component sums each no greater than said particular predetermined value, and wherein in said selecting step said one of said signal points of said ensemble is selected to drive each one of said first and second running sums toward said particular predetermined value.

28. The invention of claim 27 wherein each of the components of each of the signal points of said alphabet is an odd integer.

29. The invention of claim 27 wherein said particular predetermined value is zero.

30. The invention of claim 27 wherein said alphabet is partitioned such that each subset that includes a particular one of the signal points of said alphabet also includes a signal point each of whose components is the negative of the corresponding component of said particular one signal point.

31. A method for use in a data transmission system of the type in which individual signal points are selected from a predetermined signaling alphabet for transmission over a communication channel as a function of a sequence of input words at least ones of whose bits have been trellis coded, said method comprising the steps of maintaining first and second running values which are functions of respectively, the odd and even components of the selected signal points, selecting said individual signal points for transmission further as a function of the first and second maintained running values, and generating on said communication channel a passband signal representing the selected signal point for transmission, said passband signal being comprised of a plurality of pulses whose individual in-phase and quadrature-phase amplitudes being respectively associated with the odd and even components of said selected signal point.

32. The invention of claim 31 wherein said first and second running values are running sums of, respectively, the odd and even components of the selected signal points.

* * * * *